June 17, 1952 H. L. MALONE ET AL 2,600,789
FLASHLIGHT DEVICE
Filed March 23, 1950

HAROLD L. MALONE
GEORGE C. UNDERWOOD
INVENTORS

BY Daniel J. Mayne
Earl T. Paramore
ATTORNEYS

Patented June 17, 1952

2,600,789

UNITED STATES PATENT OFFICE 2,600,789

FLASHLIGHT DEVICE

Harold L. Malone, Rochester, N. Y., and George C. Underwood, Boston, Mass., assignors to Eastman Kodak Company, Rochester, N. Y., a corporation of New Jersey Application March 23, 1950, Serial No. 151,496

5 Claims. (Cl. 67—31)

1

The present invention relates to flash photography and particularly to a flash holder which is to contain the flashlamp and batteries, and which is adapted to be detachably connected to a camera, or other housing, so as to connect the battery and lamp circuit of the flash holder in operative relation with another portion of the flash circuit carried by the camera, or housing.

The primary object of the present invention is to provide a flash holder which is extremely simple in construction and inexpensive, in that it requires a minimum number of parts which are readily assembled, but which, despite its simplicity, possesses certain features which are desirable and necessary in such devices and are lacking in some respects in flash holders which are of a much more complicated and expensive construction.

Another object is to provide a flash holder of the type described wherein a single spring contact serves as the base contact of the lamp socket and as the contact for the top terminal of the batteries, and in which said spring contact is so formed and arranged that its tension is increased when the batteries are in place so that it exerts an added force on the base of the lamp to provide good electrical contact, and to provide the necessary force to eject the lamp from its socket when it is manually released. The form and disposition of the spring contact also insures the pressure on the top of the batteries being applied axially thereof to eliminate any tendency for the batteries to jackknife out of stacked relation.

A further object is to provide a flash holder of the type described which is adapted to be detachably connected to the wall of a camera, having a built-in synchronizer and two terminal sockets in the camera wall; said flash holder having two terminals forming a part of its circuit and extending from the side thereof which are adapted to engage the terminal sockets on the camera. One socket terminal on the camera and one terminal on the flash holder have cooperable threaded connections, while the other socket terminal and flash holder terminal engage with a sliding fit so that when the flash holder terminal is threaded into or onto the socket terminal, the other flash holder terminal is drawn into its corresponding socket terminal. This results in

2 the flash holder being rigidly connected to the camera so that it may be used as a handle for carrying the combination, and also results in a good electrical connection between the flash holder circuit and the camera circuit.

And yet, another object is to provide a flash holder of the type set forth wherein the threaded terminal of the flash holder is drawn tightly into engagement with a contact strap in the flash holder when the flash holder is connected to the camera wall so that a good electrical connection is assured at this point.

The novel features that we consider characteristics of our invention are set forth with particularity in the appended claims. The invention itself, however, both as to its organization and its methods of operation, together with additional objects and advantages thereof, will best be understood from the following description of specific embodiments when read in connection with the accompanying drawing, in which Fig. 1 is a vertical sectional view of a flash holder constructed in accordance with a preferred embodiment of the present invention;

Like reference characters refer to corresponding parts throughout the drawing.

Figure 1:
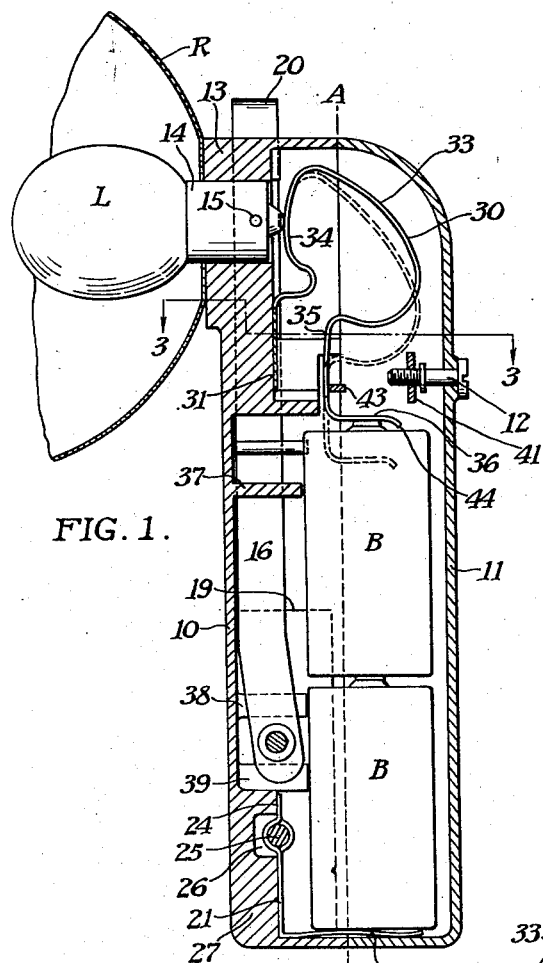

Referring now to the drawings, the present flash holder comprises an elongated two-piece phenolic or plastic casing 10 separable along the line A—A. The casing proper contains all of the contacts, batteries and mounting screw, while the cover 11 is just a shell having a coin-slotted screw 12 for attaching the cover to the casing. The wall of the casing opposite the cover is provided with a socket 13 into which a flashlamp "L" having a bayonet-type base 14 is adapted to be inserted with an axial thrust. Fixed to the wall of the casing in surrounding relation with the socket 13 is a reflector "R." The wall of the socket is provided with at least one axial groove to receive the pins 15 extending radially from the base of the lamp, as is conventional procedure, and to cause the lamp to be properly oriented upon insertion into the socket. The lamp is releasably held in the socket by an elongated contact strap 16 which has an aperture 17 adjacent its upper end into which one of the pins 15 on the lamp base is adapted to snap, see Fig. 2. In order to normally force the upper end of this contact strap 16 toward the socket and into a locking position, the lower end thereof is wedged between a pair of ribs 18 and 19 extending from the casing wall. The edge of rib 18 engaged by one face of the contact strap is displaced to the right of the plane containing the bayonet pin 15 of the lamp so that the upper end of the contact strap is normally biased to the left, see Fig. 2. The lower edge of the other rib 19 acts as a fulcrum point for the lower end of contact strap 16 and this rib also extends some distance upwardly of the casing to provide a stop for the other face of the strap when the upper end thereof is moved to the right to release the lamp base. The extreme upper end 20 of the strap 16 extends through an elongated aperture 21 in the top of the casing so that by pressing this end to the right, Fig. 2, with the finger, the operator can release the lamp from the socket. This contact strap 16 also serves as one lead of the lamp and battery circuit of the flash holder.

Figure 2:
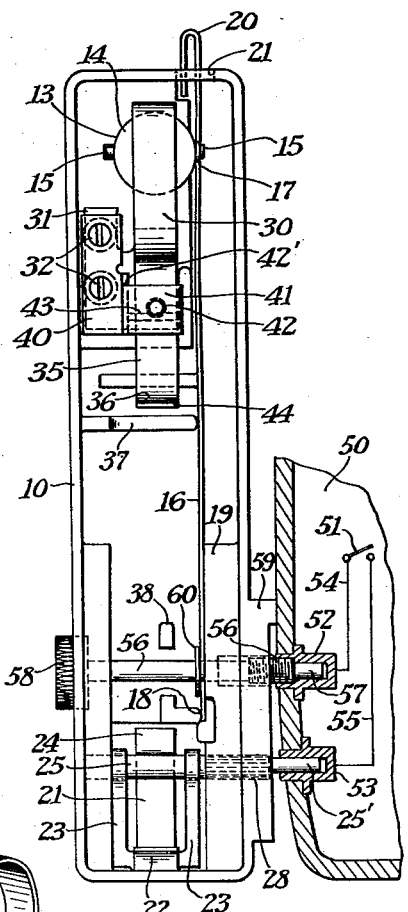
Fig. 2 is a rear elevational view of the flash holder with the cover thereof removed and the batteries removed therefrom and showing the flash holder connected to the side wall of a box camera which might have a built-in synchronizer switch in its shutter.
Figure 3:
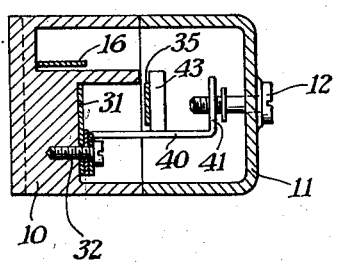
Fig. 3 is a sectional view taken substantially on line 3—3 of Fig. 1.

The lower battery contact comprises an L-shaped member 21, one arm 22 of which extends transversely of the bottom of the casing, and the other arm of which is separated into three tongues 23 and 24 which are connected to pin 25 extending transversely of the casing, and being disposed in a cut-out 26 in the reinforced portion 27 of the wall of the casing, see Figs. 1 and 2. This pin 25 is knurled at 28 where it extends through the casing wall so that it cannot rotate. Looking at Fig. 2, the two like tongues 23 of contact member 21 have their upper ends curved from the plane of the tongues proper, and these curved portions embrace one side of the pin 25. The center tongue 24, however, is curved in the opposite direction to engage the other side of the pin and has its extreme end anchored against the face of the reinforced portion of the casing wall and in the same plane as the lower portions of the tongues. The corner of L-shaped member 21 rests in a corner between two walls of the casing and the bottom arm 22 of the member 21 is bent upwardly. When the batteries "B" are inserted into the casing, the bottom of the lowermost one engages arm 22 of member 21 and is urged upwardly by the resilience thereof. When downward pressure is applied to arm 22 of member 21, the tendency is for the curved portions of each of tongues 23 and 24 to more firmly grip the pin 25 and since pin 25 is to provide one lead of the battery and lamp circuit, this high-pressure engagement is desirable for good electrical contact between member 21 and pin 25. While this method of assembling contact member 21 and contact pin 25 into the casing is advantageous for the reason that it involves no separate screws which may become accidentally loosened, a further advantage derived therefrom is that the high-pressure contact between the tongues of member 21 and pin 25 necessary to electrical contact is automatically applied when the batteries are inserted into the casing; or, in other words, at the time the device is made ready for use.

Figure 4:
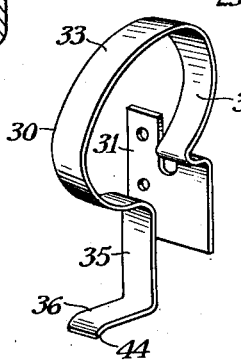
Fig. 4 is a perspective detail of the spring contact removed from the flash holder to show its shape.

The upper battery contact and the contact for the base of the lamp comprises a single spring contact 30 of the form best shown in Fig. 4. This contact spring includes one end 31 which is straight and is mounted in vertical relation on a reinforced portion of the front wall of the casing and below the socket 13 by a pair of screws 32. These are the only two screws required in assembling all of the contacts in the entire flash holder. The intermediate portion 33 of spring contact 30 is bent into the general shape of an ellipse, and one portion 34 thereof lies behind the lamp socket and constitutes the contact to be engaged by the contact in the base of the lamp. The other end of the spring contact 30 includes a substantially straight portion 35 which extends substantially axially of the casing and another substantially straight portion 36 at right angles thereto which is adapted to engage the top terminal of the uppermost battery "B."

When the batteries are not in the case, the normal tendency for the tension in the bowed portion of the spring contact 30 is to expand and force the battery-engaging end 36 downwardly to the position shown in dotted lines in Fig. 1, or the full-line position shown in Fig. 2. At the same time, the bowed portion of the spring contact will open somewhat and assume a position somewhat like that indicated by the dotted line in Fig. 1. In this position, it will be observed that the bowed portion 33 of the contact spring has expanded in a direction relatively away from the end of the lamp socket to some extent. When the batteries are inserted, the end 36 of the contact spring is moved axially upward to the full-line position and the bowed portion of the spring is again put under compression. Now, since the end 36 thereof is held against movement by the batteries, the bowed portion tends to expand and will produce a pressure on the base of the lamp which is not only sufficient to give good electrical contact, but is sufficient to eject the lamp from the socket when it is released therefrom by operation of end 20 of contact strap 16 to the right (Fig. 2).

Looking at Fig. 1, it will be seen that the batteries "B" engage and are positioned by ribs 37, 38, and 39 formed in the front wall of the casing. It will be noted that the normal tendency of spring contact 30 in expanding would be to move the end 36 thereof not axially of the casing and batteries, but at an angle to the casing and battery axis. If this condition is allowed to exist, in the present instance the spring would tend to move the top battery out of the casing, or if it tended to push in the opposite direction relative to the battery axis, it would tend to jackknife the batteries out of the casing. Under these conditions, it is difficult to hold the batteries in position until the cover is placed on the casing, and the instant the cover is removed the batteries fall out. This is prevalent in most existing flash holders and ordinary flashlight battery containers wherein the batteries are slipped into position sideways, rather than axially from the rear end.

Figure 5:
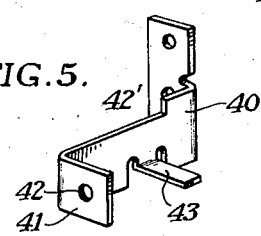
Fig. 5 is a perspective detail of the locking bracket removed from the flash holder to show its form.

To overcome this difficulty, we provide means for constraining the movement of the free end 36 of the spring contact in a direction axially of the casing and the batteries. To this end, we mount a locking bracket 40 of the form best shown in Fig. 5, to the front wall of the casing 10 by the same screws 32 which hold the spring contact 30 in position. This bracket is designated as a locking bracket since one of its functions is to cooperate with the locking screw 12 to hold the cover 11 on the casing. In order to so function, the end of the locking bracket has a turned-down end 41 provided with a tapped hole 42 into which the locking screw 12 is threaded when the cover is placed on the casing. The locking bracket 40 also includes an intermediate portion 42' which extends transversely of the casing just above the end 36 of the spring contact 30, and this intermediate portion includes a turned-out stop member 43 which engages the straight portion 35 of the contact spring 30 and constrains it to move axially of the casing when the contact 30 is expanding, or is being compressed upon insertion of the batteries. By so constraining the movement of the free end of the spring contact to a direction extending axially of the casing and batteries, it is assured that the batteries will be held in place by an axial thrust so that there will be no tendency for them to jackknife out of position. In fact, with this construction we have found that after the two batteries are inserted into the casing, the casing may be held sidewise with the cover off and the batteries will not fall out. Constraining the movement of the free end of the spring contact 30 to a direction axially of the casing also serves to insure the bowed portion of the spring being compressed in a controlled manner so that its portion 34 moves closer to the rear of the socket 13 and its pressure is directed toward the base of the lamp inserted in the socket.

A further function served by this locking bracket 40, or, more specifically, the stop member 43 thereof, is that it will positively limit the upward movement of end 36 of the contact spring 30 to prevent the batteries from falling out of the casing when the cover is removed. To further aid in this function, the extreme end of the portion 36 of the spring contact is turned down, as indicated at 44, so that it normally overhangs the terminal of the top battery. The recommended procedure for inserting the batteries into the flash holder is to place the top battery in position first; then, after pushing this battery axially upward, inserting the bottom battery. The insertion of the batteries will also be made easier if done with the lamp out of its socket because then the contact spring 30 will be under least compression.

This flash holder is adapted to be detachably connected to a camera having a built-in synchronizer. In Fig. 2, we have shown one wall of a box camera 50 which will have a switch 51 built into its shutter mechanism to be operated in synchronism with the shutter-opening movement in a well-known manner. Inasmuch as the manner in which the switch is built into the shutter is not critical to our invention, and many different types of built-in synchronizers are known in the art, for purposes of disclosing the present invention we have indicated this switch and its circuit only diagrammatically. The wall of the camera will be provided with two terminal sockets 52 and 53 connected to opposite sides of the switch 51 by leads 54 and 55; one of the terminal sockets, the upper one 52 for example, will be internally threaded.

In order to attach the present flash holder with a camera of this type, the pin 25 is provided with an extending end 25' which is adapted to slideably engage the lower terminal socket 53. An attaching screw 56 extends transversely through the casing 10 and the end 57 thereof extending from the wall of the casing is threaded to engage the threaded terminal socket 52 in the camera wall. In order to attach the flash holder to the camera, it is only necessary to insert the end 25' of pin 25 into the terminal socket 53 and insert the threaded end 57 of screw 56 into the other terminal socket 52. Now, as the screw 56 is rotated, by gripping knob 58, accessible from the other side of the flash holder, the flash holder will be drawn to the camera wall until an abutment 59 on the flash holder engages the camera wall. To insure good electrical connection between conducting strap 16 and attaching screw 56, the screw extends through a hole in the strap and a shoulder or washer 60 fixed to the screw is drawn down against the strap with a high pressure as the flash holder is attached to the camera wall. The complete flash circuit will then comprise the spring contact 30 from the top terminal of the batteries to the base of the lamp, through the lamp filament to the shell of the lamp, through the conducting strap 16, attaching screw 56, the socket terminal 52 and lead 54 to one side of the switch 51. From the other side of the switch 51 the circuit includes lead 55, socket terminal 53, pin 25, 25', and, finally, lower battery contact 21 to the other side of the batteries. This attaching means for the flash holder, in addition to providing excellent electrical contacts between the several circuit elements because of high-pressure connections, is substantial enough to allow the flash holder to be used as a handle for holding and carrying the camera.

This flash holder can be readily adapted for use with any folding type camera having a between-the-lens type shutter having a built-in flash switch which is normally adapted to be connected into the flash holder circuit by a lead having the conventional bayonet-type connector. In such a case, the flash holder is usually mounted on one end of a bracket which is connected to the camera by a screw engaging the tripod screw socket which is customary equipment on all folding cameras. Then, to adapt the terminals on the flash holder to the bayonet-type connector used on such flash shutters, it is only necessary to provide a circuit adapter housing which would have two socket terminals in one wall similar to those shown at 52 and 53 in the camera wall to permit attachment of the housing to the flash holder. Then, if these terminals are electrically connected to another terminal in another wall in the housing adapted to receive the conventional bayonet-type connector from the camera shutter, then the shutter switch can be readily electrically connected in circuit with the battery and lamp of the flash holder.

While we have shown and described certain specific embodiments of our invention, we are aware that many modifications thereof are possible. Our invention, therefore, is not to be limited to the precise details of construction shown and described, but is intended to cover all modifications coming within the scope of the appended claims.

Having thus described our invention, what we claim is new and desire to secure by Letters Patent of the United States is:

1. In a flash holder the combination of an elongated, hollow, battery casing fabricated from an insulating material and adapted to contain a battery disposed in axial relation with the casing; one wall of the casing, adjacent one end thereof, provided with an aperture into which a flashlamp is adapted to be inserted with an axial thrust; a resilient contact in the bottom of said casing adapted to engage the lower end of the battery when inserted into the casing and urge the same upwardly of the casing, a terminal extending to the outside of the casing and electrically connected to this resilient contact; a second terminal extending to the outside of the casing in side-by-side relation with the first terminal; an elongated contact strap electrically connected at one end with this second terminal, the other end of said strap normally urged toward the wall of said aperture and provided with a cut-out portion adapted to engage a part on the shell of a flashlamp base when inserted in said aperture to retain the lamp in said aperture, the upper free end of said strap extending through an elongated slot in the top of said casing to permit manual movement thereof to release said lamp; a contact spring adapted to connect the upper end of the battery to the center contact in the base of the lamp when the two are placed in the casing; said contact spring so formed and mounted in said casing that the thrust imparted to the top of the batteries by one end thereof is substantially axially of the batteries, and the tension in that portion thereof adapted to engage the base of a lamp inserted into said aperture is increased when the batteries are inserted in place to provide a resilient force necessary for resilient ejection of the lamp from its socket, and to provide good electrical contact between itself and the base contact of the lamp.

2. A flash holder according to claim 1 characterized by the fact that said contact spring comprises a metal strip having one end extending axially of said casing and fixed to the wall thereof adjacent and below said aperture, the other end of said strip having the shape of an L the bottom arm of which extends transversely of the casing and is adapted to engage the top terminal of the battery, and the intermediate portion of said strip bowed in the general shape of an ellipse one end of which lies behind said aperture in a position to be engaged by the base contact of a lamp when inserted into said aperture, and means for restricting the vertical leg of the L-shaped end of said contact spring to movement substantially axially of the casing when battery is inserted therein, whereby the tension in the bowed portion of the strip is increased and the pressure exerted by that portion adapted to engage the base contact of a lamp is increased to provide a good electrical contact and a sufficient force to eject the lamp from the aperture when released.

3. A flash holder comprising an elongated hollow battery casing fabricated from an insulating material; a lamp socket in the wall of said casing adjacent the top thereof and adapted to receive the base of a flashlamp when thrust axially thereinto; a resilient contact in the bottom of said casing adapted to engage one pole of a battery placed in said casing and normally force said battery axially upward in said casing, a first terminal extending to the outside of said casing and electrically connected to said resilient contact; a second terminal extending to the outside of said casing in side-by-side relation with said first terminal; a conducting strap electrically connected to said second terminal and adapted to releasably engage a contact on the shell of a lamp base when thrust into said socket; an elongated spring contact for connecting the other pole of a battery placed in said casing with the contact in the base of a flashlamp inserted into said socket, said spring contact having one end fixed to the wall of said casing, and the other end adapted to engage the other pole at the top of the battery when the latter is inserted into said casing, and the intermediate portion of said contact spring bowed into a shape approximating an ellipse a portion of which is disposed behind said socket to engage the contact in the center of a lamp base inserted into said socket, and means for constraining the movement of the free end of said contact spring due to the expansion action of said bowed portion, and the compression action of batteries when removed from and inserted into, respectively, said casing, to one directed substantially axially of said casing, whereby when the batteries are not in the casing the bowed portion expands and moves the free end of the conducting strip to a point below that occupied by the top of the battery and when the battery is inserted the bowed portion is more constricted and the portion thereof opposite said socket is moved closer thereto and provides sufficient force to eject the lamp from the socket upon release therefrom.

4. A flash holder according to claim 3 and in which said last-mentioned constraining means comprises a substantially straight portion in said conducting strip between the free end and the bowed portion thereof arranged to extend substantially axially of said casing, and a fixed guide in said casing engaging said straight portion of said conducting strip to confine its movement to one axially of the casing.

5. A flash holder adapted to be positively connected to one wall of a housing including a part of a flashlamp synchronizer circuit and having two terminal sockets in its wall electrically connected in said circuit and one of said terminal sockets being threaded, and comprising an elongated hollow battery casing fabricated from an insulating material; a lamp socket in the wall of said casing adjacent the top thereof into which the base of a flashlamp is adapted to be inserted with an axial thrust; a resilient contact in the bottom of said casing adapted to engage one pole of a battery inserted in said casing and normally force said battery axially upward in said casing; a terminal electrically connected to said contact and extending from said casing in fixed relation thereto and adapted to slideably engage the unthreaded terminal socket on said housing; an elongated spring contact fixed at one end in said casing adjacent said lamp socket, and including a bowed portion disposed behind said socket to be engaged by the base contact of a lamp inserted into said socket and a free end adapted to engage the top terminal of a battery inserted into said casing, means for constraining the motion of the free end of said spring contact to move axially of said casing when the bowed portion of the spring is free to expand in the absence of a battery and is compressed upon insertion of a battery; an elongated contact strap extending substantially axially of said casing and disposed so that one end thereof is adapted to engage the shell of the lamp base inserted into said socket, an attaching screw rotatably extending through said casing and terminating in a threaded terminal adapted to threadedly engage the threaded terminal socket on said housing to electrically connect the circuit in said casing to that in said housing, and at the same time positively connect said casing to said housing, and a shoulder on said screw adapted to be drawn down tight into engagement with said contact strap when the casing is attached to said housing and thus insure a good electrical connection between the screw and strap.

HAROLD L. MALONE.
GEORGE C. UNDERWOOD.

REFERENCES CITED

The following references are of record in the file of this patent:

UNITED STATES PATENTS

| Number | Name | Date |
| --- | --- | --- |
| 2,020,741 | Rush | Nov. 12, 1935 |
| 2,443,163 | Harmon | June 8, 1948 |